(12) United States Patent
Zhang et al.

(10) Patent No.: US 10,970,277 B2
(45) Date of Patent: Apr. 6, 2021

(54) SYSTEM AND METHOD FOR DYNAMIC CONVERSION OF DATABASE ACCESSING SCRIPTS DURING RUNTIME IN A MAINFRAME REHOSTING PLATFORM

(71) Applicant: Oracle International Corporation, Redwood Shores, CA (US)

(72) Inventors: Weixuan (Wade) Zhang, Beijing (CN); Hui Shen, Beijing (CN); Wei Wang, Beijing (CN); Jim Wang, Beijing (CN)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 722 days.

(21) Appl. No.: 15/386,405

(22) Filed: Dec. 21, 2016

(65) Prior Publication Data
US 2017/0206245 A1    Jul. 20, 2017

Related U.S. Application Data

(60) Provisional application No. 62/280,815, filed on Jan. 20, 2016.

(51) Int. Cl.
*G06F 16/2452* (2019.01)
*G06F 16/21* (2019.01)
(Continued)

(52) U.S. Cl.
CPC ........ *G06F 16/2452* (2019.01); *G06F 9/4552* (2013.01); *G06F 16/213* (2019.01); *G06F 16/258* (2019.01)

(58) Field of Classification Search
CPC ... G06F 16/972; G06F 16/2452; G06F 16/258
See application file for complete search history.

(56) References Cited

U.S. PATENT DOCUMENTS 5,678,044 A * 10/1997 Pastilha ................... G06F 8/37
6,006,277 A    12/1999 Talati
(Continued)

OTHER PUBLICATIONS

"Oracle Tuxedo Application Rehosting Workbench Reference Guide, 12c Release 2 (12.1.3)", 2014, Oracle. (Year: 2014).*
(Continued)

*Primary Examiner* — Sheryl L Holland
(74) *Attorney, Agent, or Firm* — Tucker Ellis LLP

(57) ABSTRACT

In accordance with an embodiment, described herein is a system and method for dynamically converting data manipulation language (DML) code embedded in a mainframe application rehosted in a mainframe rehosting platform. The DML code can include SQL scripts with SQL statements, and standalone SQL statements for accessing a source database in a mainframe computer. The DML code can be converted programmatically and immediately before the DML code is to be executed during the execution of the rehosted mainframe application. A database access script converter in an application runtime of the mainframe rehosting platform can load a database schema of a target database and a set of conversion rules, parse the rehosted mainframe application to identify the DML code, and convert each SQL statement based on one or more conversion rules and the database schema, for execution against the target database.

20 Claims, 4 Drawing Sheets

(51) Int. Cl.
*G06F 16/25* (2019.01)
*G06F 9/455* (2018.01)

(56) References Cited

U.S. PATENT DOCUMENTS

| | | | |
|---|---|---|---|
| 8,010,582 B2 | 8/2011 | Zimowski | |
| 8,539,488 B1 | 9/2013 | Havemose | |
| 8,881,139 B1* | 11/2014 | Acacio | G06F 8/76 |
| | | | 717/177 |
| 9,430,505 B2 | 8/2016 | Padmanabhan | |
| 2007/0067771 A1 | 3/2007 | Kulbak et al. | |
| 2010/0049763 A1* | 2/2010 | Jung | G06F 16/245 |
| | | | 707/721 |
| 2010/0185645 A1* | 7/2010 | Pazdziora | G06F 16/242 |
| | | | 707/760 |
| 2010/0262970 A1 | 10/2010 | Havemose | |
| 2012/0159427 A1 | 6/2012 | Oara | |
| 2012/0265726 A1* | 10/2012 | Padmanabhan | G06F 16/214 |
| | | | 707/602 |
| 2012/0324434 A1* | 12/2012 | Tewari | G06F 8/60 |
| | | | 717/168 |
| 2014/0067750 A1* | 3/2014 | Ranganathan | G06F 16/283 |
| | | | 707/602 |
| 2014/0068269 A1 | 3/2014 | Zhou | |
| 2015/0278314 A1* | 10/2015 | Fuglsang | G06F 16/2452 |
| | | | 707/736 |

OTHER PUBLICATIONS

United States Patent and Trademark Office, Office Action dated Nov. 19, 2018 for U.S. Appl. No. 15/386,392, 11 Pages.
George Eadon et al., "Supporting Table Partitioning by Reference in Oracle", SIGMOD '08, Jun. 9-12, 2008, Vancouver, BC, Canada, Copyright 2008, 12 Pages.
Oracle, "Oracle Tuxedo Application Runtime for Batch Reference Guide 12c Release 1 (12.1.1)", Sep. 2013, Copyright © 2010, 2013, 156 Pages.
United States Patent and Trademark Office, Office Action dated Sep. 18, 2018 for U.S. Appl. No. 15/386,410, 12 Pages.
Mark Rakhmilevich, Oracle® Mainframe Rehosting Leveraging Oracle Tuxedo: Accelerating Cost Reduction and Application Moderationization, Jun. 2008, Updated Mar. 2009, 37 pages.
United States Patent and Trademark Office, Office Action dated Oct. 4, 2019 for U.S. Appl. No. 15/386,399, 26 Pages.
Bruni, Paolo et al., IBM International Technical Support Organization, "DB2 Data Management Software—Moving Data Across the DB2 Family", © 2003, Feb. 2003, 366 pages.
Graefe, Goetz et al., "Sort-Merge-Join: An Idea Whose Time Has(h) Passed?", IEEE © 1994, pp. 406-417.

* cited by examiner

SYSTEM AND METHOD FOR DYNAMIC CONVERSION OF DATABASE ACCESSING SCRIPTS DURING RUNTIME IN A MAINFRAME REHOSTING PLATFORM

CLAIM OF PRIORITY

This application claims the benefit of priority to U.S. Provisional Application titled "SYSTEM AND METHOD FOR DYNAMIC CONVERSION OF DATABASE ACCESSING SCRIPTS DURING RUNTIME IN A TRANSACTIONAL PROCESSING ENVIRONMENT", application Ser. No. 62/280,815, filed Jan. 20, 2016, which application is herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to application servers and application rehosting, and are particularly related to a system and method for dynamic conversion of database accessing scripts during runtime in a mainframe rehosting environment.

BACKGROUND

To reduce costs and become as agile as possible, organizations today are increasingly seeking to move business-critical mainframe applications to open systems and cloud environments. However, to do so can often imply complex, costly and resource-heavy application migration projects, which deter companies from undertaking such migrations. Over the years, mainframe application rehosting has become a preferred option for many organizations for modernizing their mainframe legacy systems.

A migrated mainframe application can include database access scripts in a format consistent with a database on a mainframe computer. The database access scripts need to be converted, so that they can be executed against a different type of database on a rehosting platform.

SUMMARY

In accordance with an embodiment, described herein is a system and method for dynamically converting data manipulation language (DML) code embedded in a mainframe application rehosted in a mainframe rehosting platform. The DML code can include SQL scripts with SQL statements, and standalone SQL statements for accessing a source database in a mainframe computer. The DML code can be converted programmatically and immediately before the DML code is to be executed during the execution of the rehosted mainframe application. A database access script converter in an application runtime of the mainframe rehosting platform can load a database schema of a target database and a set of conversion rules, parse the rehosted mainframe application to identify the DML code, and convert each SQL statement based on one or more conversion rules and the database schema, for execution against the target database.

DETAILED DESCRIPTION

As companies face increasing pressure to deliver more business value from their IT spending and free up funding for new business initiatives, more and more companies are migrating their mainframe applications to open systems, such as Oracle Tuxedo Application Runtimes (ART), to reduce mainframe costs and to modernize legacy applications.

Mainframe Rehosting Platform

Figure 1:
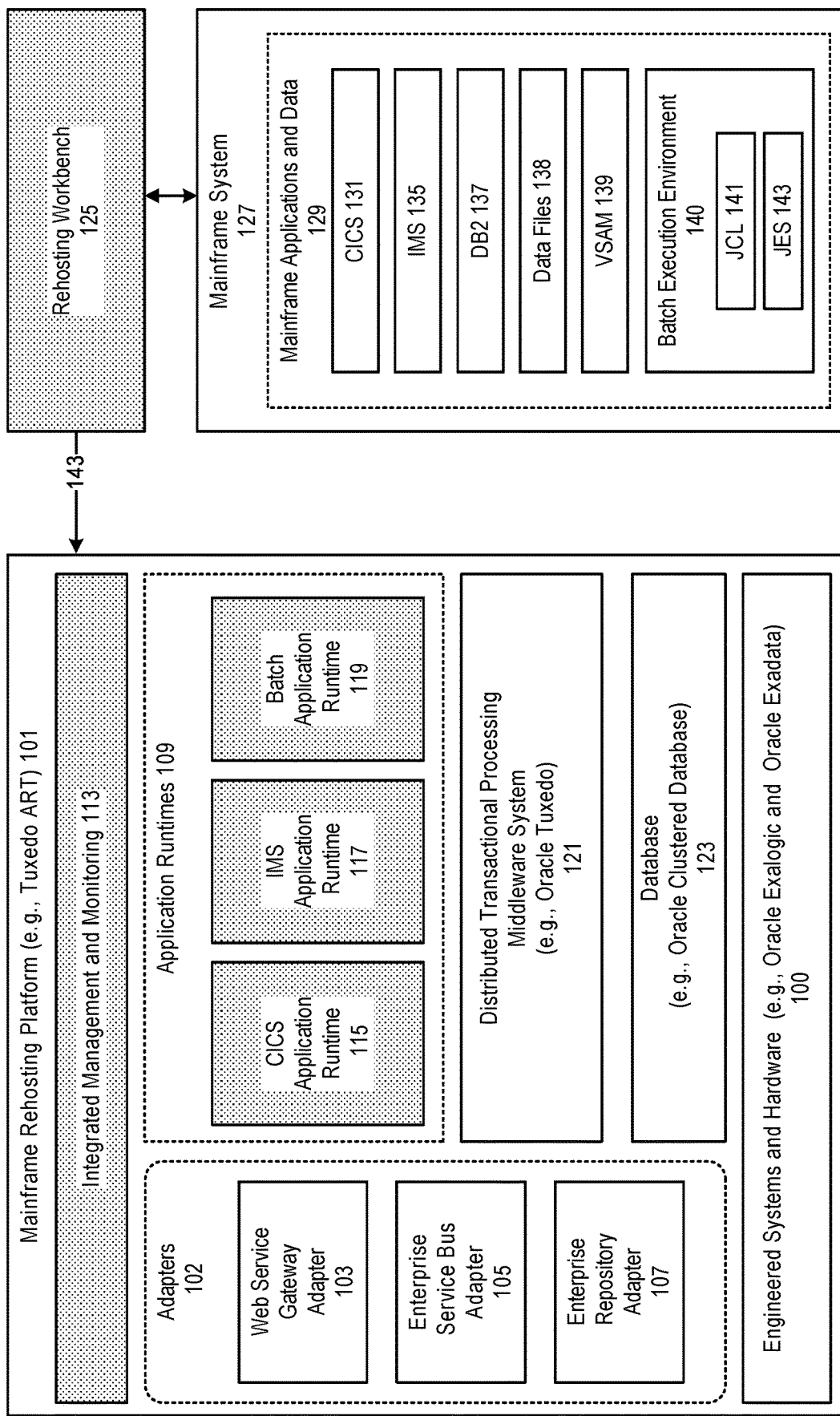
FIG. 1 illustrates an exemplary mainframe rehosting platform, in accordance with an embodiment.

FIG. 1 illustrates an exemplary mainframe rehosting platform, in accordance with an embodiment.

As shown in FIG. 1, a mainframe rehosting platform 101 and a rehosting workbench 125 can provide a system for rehosting mainframe applications and data 129 on lower-cost platforms without losing business value or sacrificing Quality of Service (QoS).

In accordance with an embodiment, the mainframe applications and data 129 to be rehosted can currently run on a mainframe system 127, for example, an IBM mainframe system; and can include a customer information control system (CICS) 131, an information management system (IMS) 135, a DB2 database 137, one or more data files (e.g., sequential files) 138, and a virtual storage access method (VSAM) file management system 139.

In accordance with an embodiment, the CICS and the IMS can be middleware products on the mainframe system. The CICS is a heavy and rigid transaction processing management system designed to support rapid, high-volume online transaction processing. The IMS is a light-weight message-based transaction processing management system. The middleware products can be used to host business logic written in COBOL, PL/I, C, Assembly or 4GLs. The VSAM can comprise different file organizations which can be used by application programs to manage their data. The file organizations can include key sequenced data set key (KSDS), relative record data set (RRDS), entry sequenced data set (ESDS), and linear data set (LDS).

In addition, the mainframe system 127 can include a batch execution environment 140 that can support JOB Control Language (JCL) 141 and a job entry subsystem (JES) 143. JCL can be a script language to implement batch processes on the mainframe system. JES can be a major component of an operating system on the mainframe system, can receive jobs into the mainframe system, schedule the jobs for processing, and control their output processing.

As further shown in FIG. 1, the mainframe rehosting platform can include a software stack compatible with the mainframe system to run mainframe applications with little to no change to minimize the risks and cost of migration; and an integrated management and monitoring component 113 for use in monitoring the mainframe rehosting platform. The software stack can provide a set of mainframe-compatible functionalities to preserve CICS, IMS, and batch application logic and data.

In accordance with an embodiment, the software stack can include a plurality of application runtimes (ART) 109 for hosting mainframe applications, for example, a CICS application runtime 115, an IMS application runtime 117, and a batch application runtime 119. The plurality of application runtimes and a rehosting workbench 125 can be used to migrate 143 the mainframe applications 129 from the mainframe system 127 to the mainframe rehosting platform 101.

In accordance with an embodiment, the CICS application runtime can include a set of Tuxedo servers to simulate core features of the mainframe CICS. The Tuxedo system servers can provide underlying application server functions, including cluster management, request routing, health monitoring, restarts, failover, load balancing, transaction management, communication channels and gateways (ATMI, CICS, IMS, SOAP/HTTP web services, Java/JCA, .Net, ESB), and protocol conversion.

In accordance with an embodiment, the IMS application runtime can provide a set of DL/I calls for use by COBOL/C applications migrated from the mainframe system 127; a robust session environment to handle concurrent connections from a plurality of 3270 terminals; a robust execution environment to provide OLTP to process transaction codes received from the 3270 terminals via calling the migrated COBOL/C applications; and a DB plug-in on the mainframe rehosting platform.

In accordance with an embodiment, the batch application runtime 119 can include a set of Tuxedo servers to simulate mainframe JES core features. For example, the batch application runtime can provide batch management and a plurality of JES functions (e.g., job queues, classes, priorities, and initiators).

In accordance with an embodiment, the rehosting workbench can be used to automate code and data migration using migration tools in the rehosting workbench. The code and data can include COBOL programs, copybooks, BMS screens, JCL, and DB2 DDL. The code and data can be transferred from the mainframe system 127 to the rehosting workbench, which can parse source objects, calculate dependencies, generate metadata, and produce reports to indicate any missing objects or unused ones in the code and data.

In accordance with an embodiment, after the code and data are parsed, data migration tools for files and DB2 tables can run, followed by code migration tools for COBOL JCL. The code migration tools can apply sophisticated language processing to adapt COBOL code between compiler dialects, transform JCL, adapt SQL calls for differences between DB2 and Oracle DB. For data migration, the data migration tools can generate target schemas, including Oracle DDL, in the mainframe rehosting platform 101, and can automate data reloading to the generated target schemas.

In accordance with an embodiment, the rehosting workbench can be used in UNIX command line mode, and an Eclipse IDE graphical environment; and can generate system configuration files for the mainframe rehosting platform to facilitate configuration management and to simplify the deployment process.

The software stack can execute on a distributed transactional processing middleware system 121, for example, Oracle Tuxedo. The distributed transactional processing middleware system can run on an open system environment, for example, UNIX, Linux, or Windows. The distributed transactional processing middleware system can include a native distributed architecture to provide transaction manager features for IMS and CICS from the perspective of applications.

In accordance with an embodiment, the distributed transactional processing middleware system can represent a transaction-oriented middleware, or an enterprise application server designed for high availability and to provide scalable applications to support transactions on various distributed systems.

Examples of the distributed transactional processing middleware system can include Tuxedo (Transactions for UNIX, Enhanced for Distributed Operation), a message-based communications system to distribute applications across various operating system platforms and databases.

Tuxedo allows messages to be queued to persistent or non-persistent storage (memory) for later processing or retrieval. An application-to-transaction monitor interface (ATMI) in Tuxedo can provide an interface that allows messages to be added to or read from queues. Tuxedo can pass service request messages between ATMI clients and servers through operating system (OS) inter-processes. In Tuxedo, requests are sent to named services, and Tuxedo uses memory based inter-process communication facilities to queue the requests to servers.

Rehosted mainframe applications can run as Tuxedo services, and can take advantage of SOA integration and enablement capabilities via a plurality of adapters 102, for example, a web service gateway adapter 103, an enterprise service bus (ESB) adapter 105, and an enterprise repository adapter 107.

In accordance with an embodiment, rehosted/migrated applications can be configured to expose a plurality of service interfaces in legacy components via standard WSDLs, and to provide robust bi-directional web services gateway capabilities. For example, the web service gateway adapter 103, an example of which can be Oracle Service Architecture Leveraging Tuxedo (SALT) adapter, can enable the rehosted applications to participate in SOA environments.

In addition, the rehosted applications can also use the ESB adapter 105 with built-in Tuxedo Transport for heterogeneous messaging. Web services and ESB end points can be imported into an enterprise repository via the enterprise repository adapter 107 to provide visibility, service dependency tracking, and other benefits of service lifecycle governance.

As further shown in FIG. 1, in accordance with an embodiment, the distributed transactional processing middleware system can execute on an engineered system and hardware 100, such as Oracle Exalogic and Oracle Exadata; and can include a clustered database 123, such as Oracle REAL Application Clusters. The clustered database can support usage of multiple individual systems as one clustered, virtual database server; and can provide transparent synchronization of read and write accesses to databases shared by all nodes in a cluster, dynamic distribution of database workload, and transparent protection against systems failures.

In accordance with an embodiment, the system described above, by combining a distributed transactional processing middleware system, a clustered database, an engineered system, and a plurality of open system products, can provide required reliability, availability, Definitions of Terms In accordance with an embodiment, the following terms are used throughout the document.

COBOL: In accordance with an embodiment, COBOL, short for common business-oriented language, is a procedural programming language designed for business use in mainframe computers.

Job Control Language (JCL): In accordance with an embodiment, JCL is a command language used in mainframe computers (e.g., IBM mainframe computers). JCL identifies programs to be executed, inputs required, and location for the inputs and output; and informs an operating system through job control statements. In a mainframe environment, programs can be written COBOL, C or another programming language, and can be executed in batch and online modes. JCL can be used to submit a program for execution in a batch mode.

Datasets: In accordance with an embodiment, datasets are mainframe files with records organized in a specific format. Datasets are stored on a direct access storage device (DASD) or tapes in a mainframe system. If a dataset is required to be used/created in a batch program, the physical name of a file (i.e., dataset) along with a file format and organization can be coded in a JCL. The definition of each dataset used in a JCL can be given using a data definition (DD) statement. The input and output resources required by a job step in JCL can be described within a DD statement, with information such as the dataset organization, storage requirements and record length.

DISP: In accordance with an embodiment, DISP, short for standards for Disposition of the Dataset, is a parameter of a DD statement, which can be used to describe the status of the dataset, disposition at the end of the job step on normal and abnormal completion.

DB2 Utilities: In accordance with an embodiment, DB2 utilities, for example, DSNTEP2 and DSNTEP4, are DB2 supplied PL/I application programs used to perform dynamic SQL statement processing in a batch mode. Results are written to the SYSPRINT DD. DSNTEP2 and DSNTEP4 use STATEMENT and CURSOR to process the dynamic SQL statements.

JavaCC: In accordance with an embodiment, JavaCC (Java Compiler Compiler) is an open source parser generator and lexical analyzer generator written in the Java programming language.

Dynamic Conversion of Database Access Scripts

In a mainframe system, a batch application, such as a JCL job, can access DB2 using a DB2 utility such as DSNTEP2/DSNTEP4 directly, with an explicit SQL script as an input. The DB2 utility can execute the SQL script and return a result back to the JCL job, as illustrated in Listing 1 below:

Listing 1

```
//STEP01 EXEC PGM=IKJEFT01,DYNAMNBR=20
//SYSTSPRT DD SYSOUT=*
//SYSTSIN DD *
 DSN SYSTEM(DSN)
```

-continued

Listing 1

```
 RUN PROGRAM(DSNTEP4) PARMS('ALIGN(LHS)') -
  LIB('DSN910.RUNLIB.LOAD')
//SYSPRINT DD SYSOUT=*
//SYSIN DD *
 SELECT * FROM TESTTAB WHERE COLDATE > '2015-10-01';
/*
```

As part of the migration of the mainframe batch application to a mainframe rehosting platform, the SQL scripts need to be converted, for example, from a DB2 SQL format to an Oracle SQL format.

Under an existing approach, a one-time static conversion of SQL scripts from a DB2 format to an Oracle format can be problematic.

First, there is no guarantee that all the SQL scripts used by the batch application can be converted, since there is no central place for storing theses SQL scripts in the batch application. These SQL scripts can exist in any place of the batch application as long as they can be fetched as a DB2 utility feed-in resource. For example, a SQL script can be in a standalone script, a merged/concatenated DD, or an in-stream DD; and can be referenced either directly or indirectly.

Second, a SQL script may be dynamically generated from a previous program output, or a previous job step output. As a result, the content of the SQL script may not be static and may change in terms of SQL commands, depending on the logic of the previous program or the previous job step.

As such, the one-time static conversion approach may leave one or more statements unconverted.

In accordance with an embodiment, the system and method described herein can be used to dynamically converting data manipulation language (DML) code embedded in a mainframe application rehosted in a mainframe rehosting platform. The DML code can include SQL scripts with SQL statements, and standalone SQL statements for accessing a source database in a mainframe computer. The DML code can be converted programmatically and immediately before the DML code is to be executed during the execution of the rehosted mainframe application. A database access script converter in an application runtime of the mainframe rehosting platform can load a database schema of a target database and a set of conversion rules, parse the rehosted mainframe application to identify the DML code, and convert each SQL statement based on one or more conversion rules and the database schema, for execution against the target database.

In accordance with an embodiment, the SQL conversion process can be delayed until a SQL script is to be executed, so that all required SQL scripts used by the rehosted mainframe application can be converted, including dynamic generated SQL scripts.

In accordance with an embodiment, the DML code inside the rehosted mainframe application can be converted on the fly. If the DML code is dynamically generated, the conversion can occur after the DML code is generated and before the DML code is executed.

In accordance with an embodiment, the database access script converter can be implemented using JavaCC. However, it can be implemented using other languages or tools. The database access script converter can parse the source DML code and convert it to a format appropriate for a target database.

In accordance with an embodiment, a series of conversion rules can be defined to process different kinds of SQL statements. After a SQL statement is parsed, rules applicable to the statement can be selected based on the characteristics of the statement, and can be applied on the statement to generate a target statement.

In accordance with an embodiment, embodiments of the disclosure use the conversion of DML code from the DB2 format to the Oracle format as an illustrative example. It would be apparent to those skilled in the art that the systems and methods described herein can be used to convert DML code from any source database format to any target database format. It would also be apparent that the DML code is not limited to SQL code.

Figure 2:
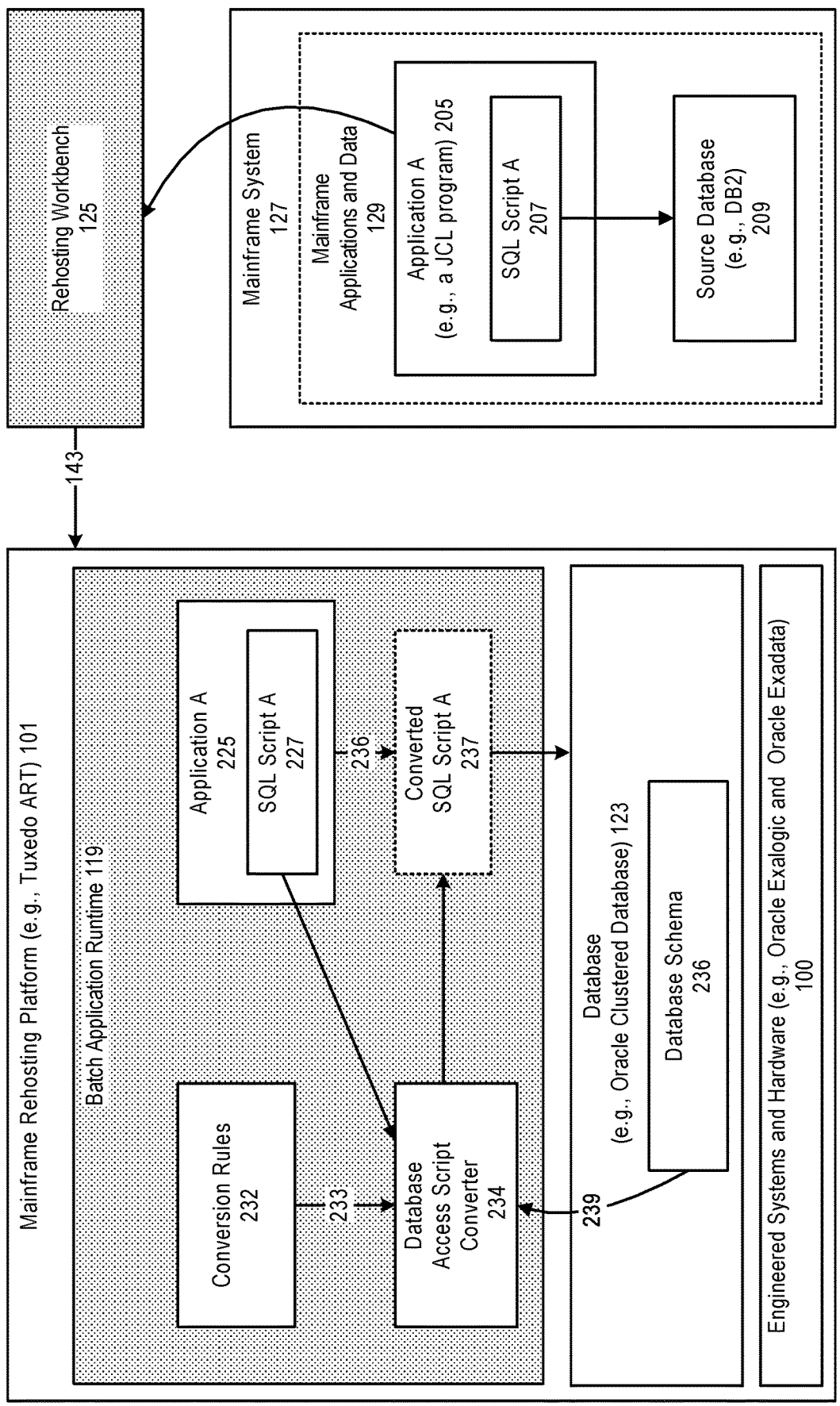
FIG. 2 illustrates a system for dynamically converting DML code embedded in a mainframe application rehosted in a mainframe rehosting platform, in accordance with an embodiment.

FIG. 2 illustrates a system for dynamically converting data manipulation language (DML) code embedded in a mainframe application rehosted in a mainframe rehosting platform, in accordance with an embodiment.

As shown in FIG. 2, application A 205 in the mainframe system 127 can include SQL script A 207 for accessing a source database 209, for example, DB2. After being migrated to the mainframe rehosting platform 101, application A 225 can still contain the same SQL script A 227, which may encounter errors when being executed against the database 123 (e.g., an Oracle database) on the mainframe rehosting platform.

In accordance with an embodiment, a database access script converter 234 can be provided in the batch application runtime to dynamically convert SQL script A from a source database (e.g., DB2) format to a target database (e.g., Oracle database) format during the execution of application A.

As further shown in FIG. 2, the batch application runtime can further include a set of conversion rules 232, which are defined to match SQL statements for various source databases to SQL statements for various target databases; and a database schema 236 that is defined by one or more database definition language (DDL) scripts.

In accordance with an embodiment, the database schema can include definition information for tables and columns in the tables. For example, the definition information can specify a table that a column belongs to, a data type of the column, and the length of the column.

In accordance with an embodiment, the database access script converter can load 233 the set of conversion rules, and load 239 the database schema 236 during the execution of application A, or when the application runtime is initialized. After encountering a SQL statement in SQL script A (or a standalone SQL statement) in the application while parsing the application, the database access script converter can parse the SQL statement, and select one or more conversion rules from the set of conversion rules based on the characteristics of the SQL statement.

Based on the selected conversion rules and the definition information loaded from the database schema, the database access script converter can convert each SQL statement in SQL script A 227, or the standalone SQL statement, from a DB2 format to an Oracle database format.

As shown in FIG. 2, converted SQL script A 237 is the result of the above-described conversion process. The converted SQL script A can be executed against the target database 123.

Figure 3:
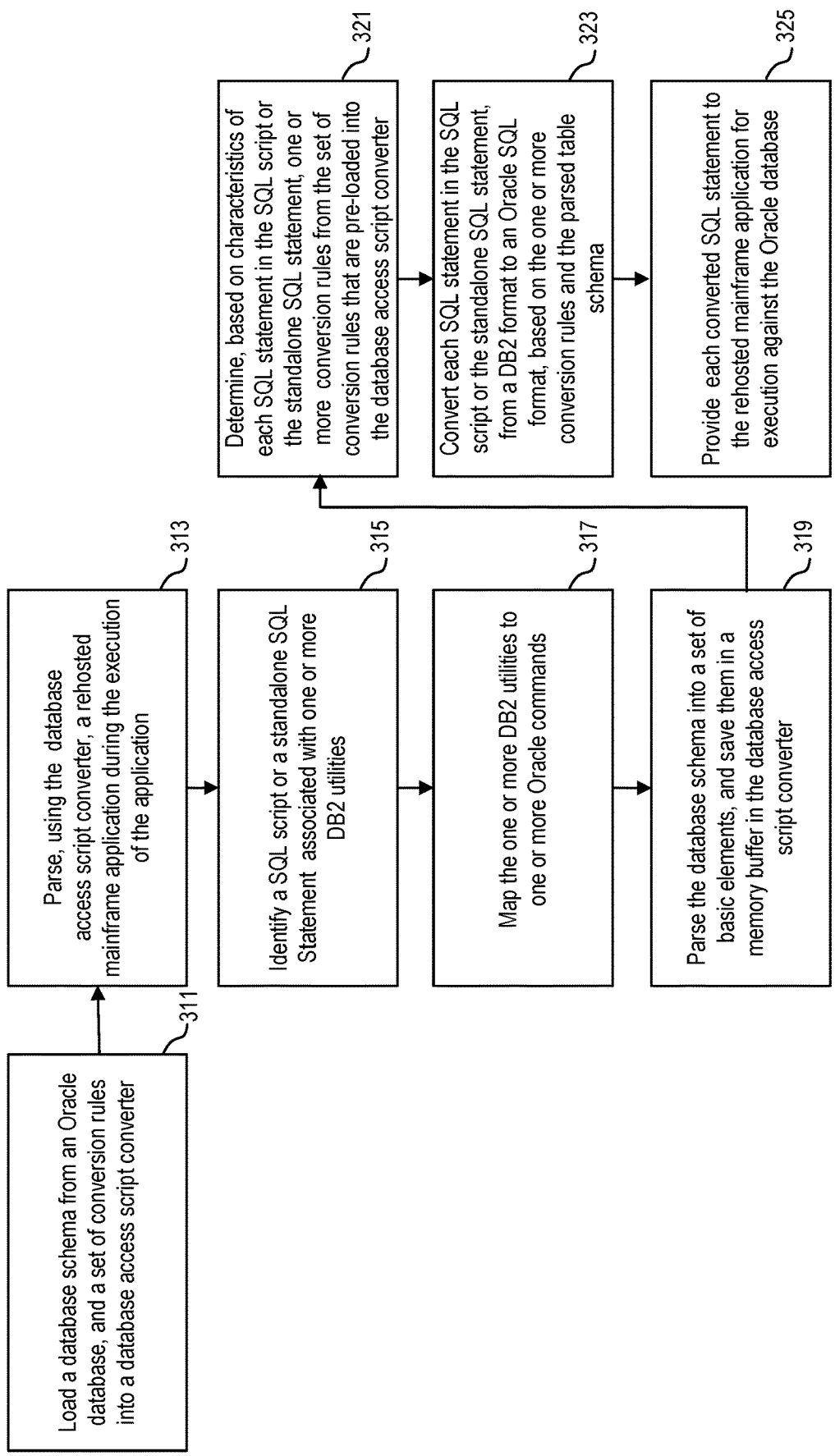
FIG. 3 illustrates an exemplary process for dynamically converting DML code embedded in a mainframe application rehosted in a mainframe rehosting platform, in accordance with an embodiment.

FIG. 3 illustrates an exemplary process for dynamically converting DML code embedded in a mainframe application rehosted in a mainframe rehosting platform, in accordance with an embodiment.

As shown in FIG. 3, at step 311, a database schema from an Oracle database, and a set of conversion rules is loaded into a database access script converter.

At step 313, the database access script converter can parse a rehosted mainframe application during the execution of the application.

At step 315, the database access script converter can identify one or more DB2 utilities in the application, and identify a SQL script or a standalone SQL statement associated the identified DB2 utility in the application. Only SQL scripts used for the one or more DB2 utilities (for example, as an input for a DB2 utility) are identified for conversion.

At step 317, the one or more DB2 utilities can be mapped to one or more Oracle commands, for example, SQL *Plus®.

At step 319, the database access script converter can parse the database schema into a set of basic elements, and save them in a memory buffer in the database access script converter.

In accordance with an embodiment, at this step, DDL statements need to be prepared, since the successful conversion of a SQL statement requires definition information for one or more tables in the SQL statement and each column in the tables.

For example, for a DB2 SQL statement "SELECT * FROM TESTTAB WHERE COLDATE>'2015-10-01'", the definition for the column COLDATE needs to be retrieved or checked from the DDL statements in the database schema. An example definition for the column COLDATE can be shown as below:

```
CREATE TABLE TESTTAB(
    COLINT    INT,
    COLCHAR   CHAR(10),
    COLDATE   DATE,
    ...
);
```

In the above example, COLDATE is a DATE data type, so the DB2 SQL statement can be converted to following Oracle SQL format:
SELECT * FROM TESTTAB WHERE COLDATE>TO_DATE('2015-10-01', 'YYYY-MM-DD');

In accordance with an embodiment, a database schema can be defined by DDL statements located in a schema center (a folder). A current default schema can be loaded first before a SQL script is accepted for conversion, so that the database access script converter can get all required table/column definition information.

In an alternative embodiment, the table schema can be loaded dynamically, for example, when the SQL script or a standalone SQL statement to be converted requires a non-current default schema definition.

At step 321, the database access script converter can determine, based on characteristics of each SQL statement in the SQL script or the standalone SQL statement, one or more conversion rules from the set of conversion rules that are pre-loaded into the database access script converter.

At step 323, each SQL statement in the SQL script or the standalone SQL statement, can be converted from a DB2 format to an Oracle SQL format, based on the one or more conversion rules and the parsed table schema.

As an illustrative example, for the example described in Listing 1, the SQL script can be initially converted into "sqlplus user/pass@connect @scriptname", where the content of the scriptname is "SELECT * FROM TESTTAB WHERE COLDATE>'2015-10-01';" and the column of COLDATE is defined as a date type. Immediately before the sqlplus is launched, the following converting process can be injected:

SQLConvert -i scriptname -o scriptname.ora
sqlplus user/pass@connect @scriptname.ora As shown above, the "SQLConvert" is the database access script converter configured to perform the conversion, and can be called immediately before the SQL script is to be passed to Oracle sqlplus for execution. "scriptname.ora" is the converted script, which can include the following SQL statement:

SELECT * FROM TESTTAB WHERE COLDATE>TO_DATE('2015-10-01', 'YYYY-MM-DD');

At step 325, each converted SQL statement can be provided to the rehosted mainframe application for execution against the Oracle database.

Figure 4:
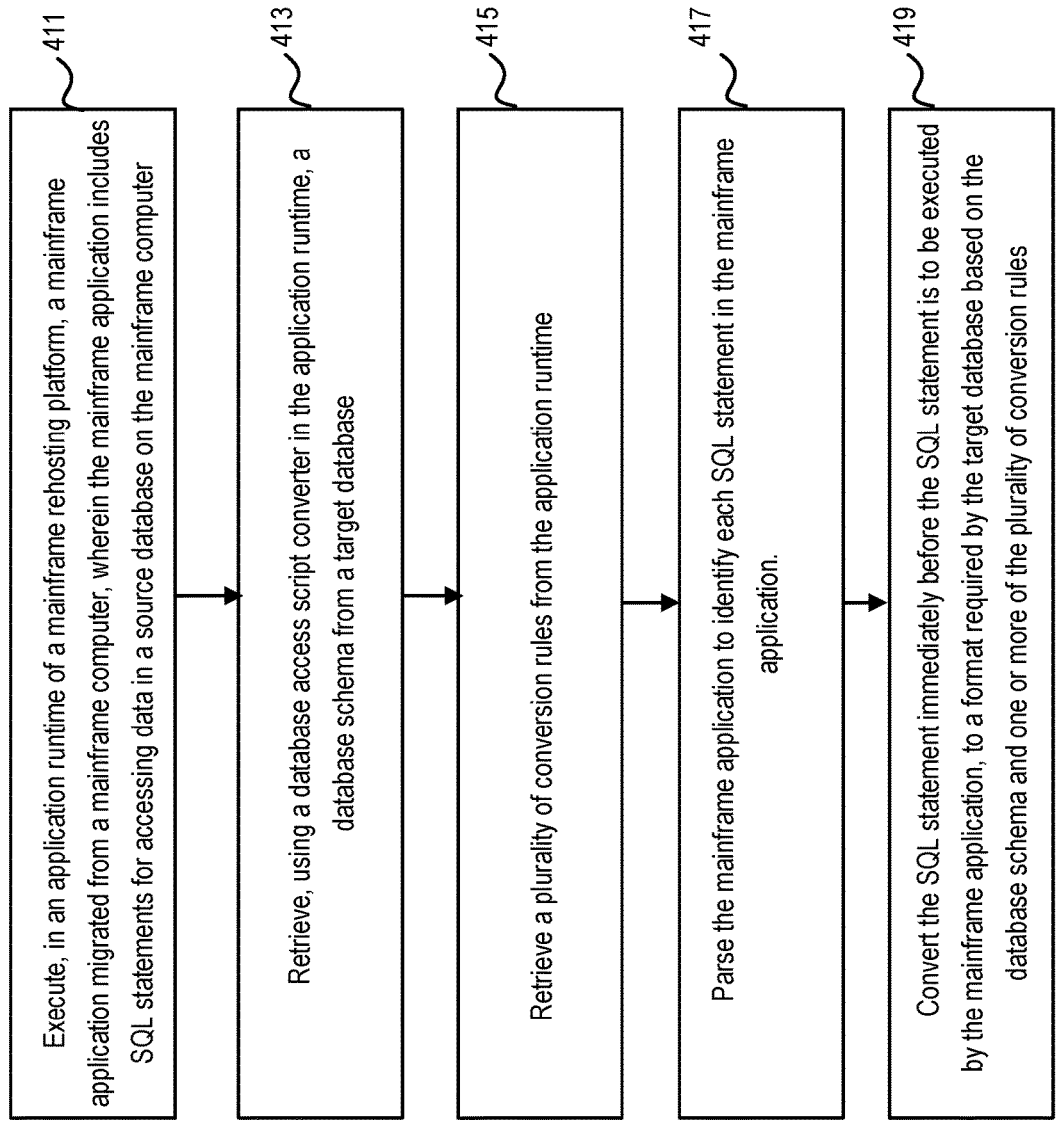
FIG. 4 illustrates a method for dynamically converting DML code embedded in a mainframe application rehosted in a mainframe rehosting platform, in accordance with an embodiment.

FIG. 4 illustrates a method for dynamically converting DML code embedded in a mainframe application rehosted in a mainframe rehosting platform, in accordance with an embodiment.

As shown in FIG. 4, at step 411, a mainframe application migrated from a mainframe computer is executed in an application runtime of a mainframe rehosting platform, wherein the mainframe application includes SQL statements for accessing data in a source database on the mainframe computer.

At step 413, a database schema is retrieved from a target database by the database access script converter.

At step 415, a plurality of conversion rules from the application runtime by the database access script converter into a memory buffer therein.

At step 417, the database access script converter parses the mainframe application to identify each SQL statement in the mainframe application.

At step 419, each SQL statement is converted immediately before the SQL statement is to be executed by the mainframe application, to a format required by the target database based on the database schema and one or more of the plurality of conversion rules.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalents.

What is claimed is:

1. A system for dynamic conversion of structured query language (SQL) statements embedded in a rehosted mainframe application, the system comprising:
   a microprocessor;
   a mainframe rehosting platform executing on the microprocessor, wherein the mainframe rehosting platform comprises an application runtime hosting a mainframe application migrated from an associated mainframe computer, wherein the mainframe application migrated from the associated mainframe computer comprises data manipulation language (DML) code comprising SQL scripts with SQL statements having a first format consistent with accessing data in an associated source database stored on the associated mainframe computer; and
   a database access script converter in the application runtime, wherein the database access script converter is configured to:
      retrieve a target database schema from a target database,
      retrieve a plurality of conversion rules from the application runtime,
      parse the mainframe application to identify SQL statements having the first format in the mainframe application, and
      during execution of the mainframe application migrated from the associated mainframe, computer:
         convert the SQL statements of the DML code having the first format before they are executed by the mainframe application migrated from the associated mainframe computer to a second format required by the target database based on the target database schema and one or more of the plurality of conversion rules; and
         delay converting the SQL scripts of the DML code until immediately before each SQL script is to be executed, wherein at least one of the SQL scripts of the DML code is dynamically generated during the execution of the mainframe application migrated from the associated mainframe computer.

2. The system of claim 1, wherein the database access script converter is further configured to provide each SQL statement converted to the second format for execution against the target database.

3. The system of claim 1, wherein the source database is a DB2 database, and wherein the target database is an Oracle database.

4. The system of claim 1, wherein the database access script converter operates to convert an SQL statement in an SQL script to the second format, wherein the SQL script comprises an input for a source database utility.

5. The system of claim 1, wherein each of the SQL statements embedded in the mainframe application is a static SQL statement or is dynamically generated.

6. The system of claim 1, wherein the database access script converter is implemented in JAVA.

7. The system of claim 1, wherein each SQL statement identified for conversion is used in a DB2 utility to access a DB2 database.

8. The system of claim 7, wherein converting the SQL statement comprises mapping the DB2 utility to an Oracle command by:
identifying one or more DB2 utilities in the mainframe application;
identifying one or more SQL scripts associated with the identified one or more DB2 utilities in the mainframe application; and
converting SQL statement of only the identified one or more SQL scripts associated with the identified one or more DB2 utilities to the second format required by the target database,
wherein the target database is an Oracle database.

9. The system of claim 1, wherein the database access script converter is configured to parse the target database schema into a set of elements and save the elements in a memory buffer in the database access script converter.

10. The system of claim 1, wherein the database access script converter is configured to select the one or more conversion rules from the plurality of conversion rules for use in converting each SQL statement having the first format, based on one or attributes of the SQL statement.

11. A method for dynamic conversion of structure query language (SQL) statements embedded in a rehosted mainframe application executing on a microprocessor, the method comprising:
executing, in an application runtime of a mainframe rehosting platform, a mainframe application migrated from an associated mainframe computer, wherein the mainframe application comprises data manipulation language (DML) code comprising SQL scripts with SQL statements having a first format consistent with accessing data in an associated source database stored on the associated mainframe computer;
retrieving, using a database access script converter in the application runtime, a target database schema from a target database;
retrieving a plurality of conversion rules from the application runtime;
parsing the mainframe application to identify SQL statements having the first format in the mainframe application; and
during the executing of the mainframe application migrated from the associated mainframe computer:
converting the SQL statements of the DML code having the first format before they are executed by the mainframe application migrated from the associated mainframe computer to a second format required by the target database based on the target database schema and one or more of the plurality of conversion rules; and
delaying converting the SQL scripts of the DML code until immediately before each SQL script is to be executed, wherein at least one of the SQL scripts of the DML code is dynamically generated during the execution of the mainframe application migrated from the associated mainframe computer.

12. The method of claim 11, wherein the database access script converter is further configured to provide each SQL statement converted to the second format for execution against the target database.

13. The method of claim 11, wherein the source database is a DB2 database, and wherein the target database is an Oracle database.

14. The method of claim 11, wherein the converting by the database access script converter comprises converting an SQL statement in an SQL script to the second format, wherein the SQL script comprises an input for a source database utility.

15. The method of claim 11, wherein each of the SQL statements embedded in the mainframe application is a static SQL statement or is dynamically generated.

16. The method of claim 11, wherein the database access script converter is implemented in JAVA.

17. The method of claim 11, wherein each SQL statement identified for conversion is associated with a DB2 utility.

18. The method of claim 17, wherein converting the SQL statement comprises mapping the DB2 utility to an Oracle command.

19. The method of claim 11, wherein the database schema is parsed into a set of elements and saved in a memory buffer in the database access script converter.

20. A non-transitory computer readable storage medium, including instructions stored thereon which when read and executed by one or more computers cause the one or more computers to perform steps comprising:
executing, in an application runtime of a mainframe rehosting platform, a mainframe application migrated from an associated mainframe computer, wherein the mainframe application comprises data manipulation language (DML) code comprising SQL scripts with SQL statements having a first format consistent with accessing data in an associated source database stored on the associated mainframe computer;
retrieving, using a database access script converter in the application runtime, a target database schema from a target database;
retrieving a plurality of conversion rules from the application runtime;
parsing the mainframe application to identify SQL statements having the first format in the mainframe application; and
during the executing of the mainframe application migrated from the associated mainframe computer:
converting the SQL statements of the DML code having the first format before they are executed by the mainframe application migrated from the associated mainframe computer to a second format required by the target database based on the target database schema and one or more of the plurality of conversion rules; and
delaying converting the SQL scripts of the DML code until immediately before each SQL script is to be executed, wherein at least one of the SQL scripts of the DML code is dynamically generated during the execution of the mainframe application migrated from the associated mainframe computer.

* * * * *

UNITED STATES PATENT AND TRADEMARK OFFICE
CERTIFICATE OF CORRECTION

Page 1 of 1

PATENT NO. : 10,970,277 B2
APPLICATION NO. : 15/386405
DATED : April 6, 2021
INVENTOR(S) : Zhang et al.

It is certified that error appears in the above-identified patent and that said Letters Patent is hereby corrected as shown below:

On the Title Page

On page 2, Column 2, under Other Publications, Line 13, delete "Moderationization," and insert -- Modernization, --, therefor.

In the Specification

In Column 5, Line 5, delete "availability," and insert -- availability. --, therefor.

In the Claims

In Column 10, Line 39, in Claim 1, delete "mainframe, computer:" and insert -- mainframe computer: --, therefor.

In Column 11, Line 27, in Claim 10, delete "or" and insert -- or more --, therefor.

Signed and Sealed this
Third Day of August, 2021

Drew Hirshfeld
*Performing the Functions and Duties of the*
*Under Secretary of Commerce for Intellectual Property and*
*Director of the United States Patent and Trademark Office*